(12) United States Patent
Lim et al.

(10) Patent No.: US 9,408,029 B2
(45) Date of Patent: Aug. 2, 2016

(54) VEHICLE, VEHICLE CLOUD SYSTEM, AND DATA DISSEMINATION SYSTEM

(71) Applicant: GWANGJU INSTITUTE OF SCIENCE AND TECHNOLOGY, Gwangju (KR)

(72) Inventors: Hyuk Lim, Gwangju (KR); In Shick Kim, Daegu (KR); Ryangsoo Kim, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 14/558,164

(22) Filed: Dec. 2, 2014

(65) Prior Publication Data

US 2015/0153176 A1 Jun. 4, 2015

(30) Foreign Application Priority Data

Dec. 3, 2013 (KR) ........................ 10-2013-0149393

(51) Int. Cl.
| | |
|---|---|
| *G01C 21/00* | (2006.01) |
| *G08G 1/123* | (2006.01) |
| *H04W 4/02* | (2009.01) |
| *G01C 21/26* | (2006.01) |
| *G08G 1/0967* | (2006.01) |

(52) U.S. Cl.
CPC ................ *H04W 4/02* (2013.01); *G01C 21/26* (2013.01); *G08G 1/096716* (2013.01); *G08G 1/096741* (2013.01); *G08G 1/096775* (2013.01)

(58) Field of Classification Search
CPC ....... G01C 21/00; G06Q 10/00; G06Q 10/04; G06Q 10/047; G08G 1/123; G08G 1/20; G09G 5/02

USPC ......... 701/408, 430, 423, 422, 420, 421, 414, 701/410; 340/995.19, 995.12, 995.13, 340/995.17
See application file for complete search history.

(56) References Cited

U.S. PATENT DOCUMENTS

| | | | | | |
|---|---|---|---|---|---|
| 2011/0270468 | A1* | 11/2011 | Kristinsson | ........... | B60W 30/18 701/2 |
| 2013/0159206 | A1* | 6/2013 | Barahona | ............... | G06Q 50/28 705/338 |
| 2014/0343756 | A1* | 11/2014 | Nefcy | ................. | B60W 10/023 701/2 |

OTHER PUBLICATIONS

(Supportive Materials for Exception on Aug. 30, 2013) Inshick Kim, Greedy Data Dissemination Algorithm for Vehicular Cloud Systems, Thesis for Master's Degree, 2013, pp. 73, School of Information and Communication, Gwangju Institute of Science and Technology.

*Primary Examiner* — Muhammad Shafi
(74) *Attorney, Agent, or Firm* — Hauptman Ham, LLP

(57) ABSTRACT

Disclosed is a data dissemination system for vehicles. The data dissemination system includes a vehicle, a vehicle cloud system, and access points connecting with and transferring data to the vehicle and the vehicle cloud system and being stationary near a road, wherein the vehicle comprises a navigator for determining location information, the vehicle cloud system comprises a dissemination setting unit for determining which data to disseminate to which access point based on the location information and vehicle route information, and the data disseminated to the access point is disseminated to the vehicle. According to the present invention, data transfer between vehicles and an infrastructure can be easily achieved such that a large amount of data can be exchanged therebetween, data transfer efficiency can be enhanced, and network resources can be fully utilized. Accordingly, the present invention has advantages of contributing to dissemination and utilization of the vehicle cloud system.

8 Claims, 9 Drawing Sheets

VEHICLE, VEHICLE CLOUD SYSTEM, AND DATA DISSEMINATION SYSTEM

CROSS-REFERENCE TO RELATED APPLICATION

This application claims priority to Korean Patent Application No. 10-2013-0149393 filed on 3 Dec. 2013, and all the benefits accruing therefrom under 35 U.S.C. §119, the contents of which is incorporated by reference in its entirety.

BACKGROUND

1. Technical Field

The present invention relates to a vehicle, a vehicle cloud system, and a data dissemination system and method for vehicles.

2. Description of the Related Art

A convenient and safe intelligent transportation system (ITS) has been introduced. In the intelligent transportation system, a communication function is provided between vehicles or between vehicles and an infrastructure.

The communication function between the vehicles and the infrastructure may be offered by access points (AP) disposed on a road on which the vehicles travels. Communication between the vehicles and the infrastructure can be achieved through dedicated short-range communication (DSRC). DSRC has a frequency band of 75 MHz, and includes six service channels and one control channel. Through such a communication function, the vehicles can receive information about traffic situations, information about navigation, and the like via the access points. Here, the access points may also be named base stations, access nodes, etc., and thus it should be understood that the term "access point" is used as a common name including such other devices.

While the access points are stationary on a road, a vehicle continuously moves at high speed. Therefore, the vehicle cannot stay long within a communication range of one access point since it is intermittently connected to the access points. Further, massive-data downloading and other services are impossible in one access point. Such a problem has been a major cause of restricting a convenient life from the intelligent transportation system itself.

BRIEF SUMMARY

The present invention has been conceived to solve such problems in the art and it is an aspect of the present invention to provide a vehicle, a vehicle cloud system, and a data dissemination system and method for vehicles, in which the vehicle can download large amounts of data, thereby enabling improvement of convenience, efficient dissemination of data, and full use of network resources.

In accordance with one aspect of the present invention, a data dissemination system for vehicles includes: a vehicle, a vehicle cloud system, and access points connecting with and transferring data to the vehicle and the vehicle cloud system and being stationary near a road, wherein the vehicle comprises a navigator for at least determining location information, the vehicle cloud system comprises a dissemination setting unit for determining which data to disseminate to which access point based on the location information and vehicle route information, and the data disseminated to the access point is disseminated to the vehicle. According to the present invention, the data dissemination system can efficiently disseminate data to the vehicle.

The vehicle route information may be generated in the navigator and transferred to the vehicle cloud system, or may be generated in the vehicle cloud system as the vehicle transfers destination information together with the location information to the vehicle cloud system, or may be generated in the vehicle cloud system based on destination information registered in the vehicle cloud system and the location information. Thus, advantageous effects of the present invention can be applied to various communication environments and service environments.

In the data dissemination system for vehicles, the dissemination setting unit may optimize a method of disseminating a minimum piece of the data to the access point such that the data can be disseminated to the access point, when a minimum probability that the vehicle fails to receive the data while traveling based on the vehicle route information is given, or may optimize a method of minimizing a probability that the access point fails to disseminate the data to the vehicle, such that the data can be disseminated to the access point, when the access points have limited storage capacities. Thus, it is possible to disseminate the data by the optimized method and smoothly cope with external environments. The optimization may be performed by a greedy algorithm.

In the data dissemination system for vehicles, the access point may be placed at a crossroad. Thus, it is possible to secure stable communication for a plurality of vehicles.

In accordance with another aspect of the present invention, a vehicle comprises: a navigator capable of determining location information and vehicle route information; and a communicator transferring the location information and information about request data, and receiving data corresponding to the information about the request data, disseminated to a plurality of access points placed on a route based on the vehicle route information, from the plurality of access points. With this structure, the vehicle can smoothly offer data service.

In the vehicle, a method of storing data in the plurality of access points may be determined by optimizing a first method of disseminating a minimum piece of the data to the access points, when a minimum probability of failing to receive the data is given, or a second method of minimizing a probability that the access points fail to disseminate the data to the vehicle, when the access points have limited storage capacities, and the optimization may be performed by a greedy algorithm. With this structure, it is possible to improve data dissemination efficiency.

In accordance with a further aspect of the present invention, a vehicle cloud system includes: a communicator receiving at least location information and information about request data from vehicles, and disseminating the request data corresponding to the information about the request data to a plurality of access points; a dissemination setting unit determining a method of disseminating the request data to the plurality of access points, based on the number of vehicles, the number of data and the number of stationary access points; and a cloud storage storing the data. With this structure, it is possible to perform data dissemination without complicated occupation of a network or excessive use of the access points.

In the vehicle cloud system, a method of disseminating the data to the plurality of access points may be determined by optimizing a first method of disseminating a minimum piece of the data to the access points, when a minimum probability of failing to receive the data is given, or a second method of minimizing a probability that the access points fail to disseminate the data to the vehicles, when the access points have limited storage capacities, and the optimization may be performed by a greedy algorithm. With this structure, the system can improve data dissemination efficiency.

In accordance with yet another aspect of the present invention, a data dissemination method for vehicles includes: disseminating at least two pieces of data to at least two access points with reference to vehicle information comprising location information and vehicle route information, access point information, and information about the data; and disseminating the data stored in the at least two access points to vehicles. According to the present invention, it is possible to achieve efficient dissemination of request data.

In the data dissemination method for vehicles, the location information may be received from the vehicles, and the location information and the vehicle information may be received from the vehicles. Thus, the present invention can be applied to various service environments.

In the data dissemination method for vehicles, a method of disseminating the data to the plurality of access points is determined by optimizing a first method of disseminating a minimum piece of the data to the access points, when a minimum probability of failing to receive the data is given, or a second method of minimizing a probability that the access points fail to disseminate the data to the vehicles. With this structure, an advantage of improving data dissemination efficiency can be expected.

According to the present invention, data transfer between a vehicle and an infrastructure can be easily achieved such that a large amount of data can be exchanged therebetween, data transfer efficiency can be enhanced, and network resources can be fully utilized.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Hereinafter, embodiments of the invention will be described in detail with reference to the accompanying drawings. It should be understood that the present invention is not limited to the following embodiments and may be easily embodied in different ways such as addition, modification, deletion or the like of elements by those skilled in the art without departing from the scope of the present invention.

Figure 1:
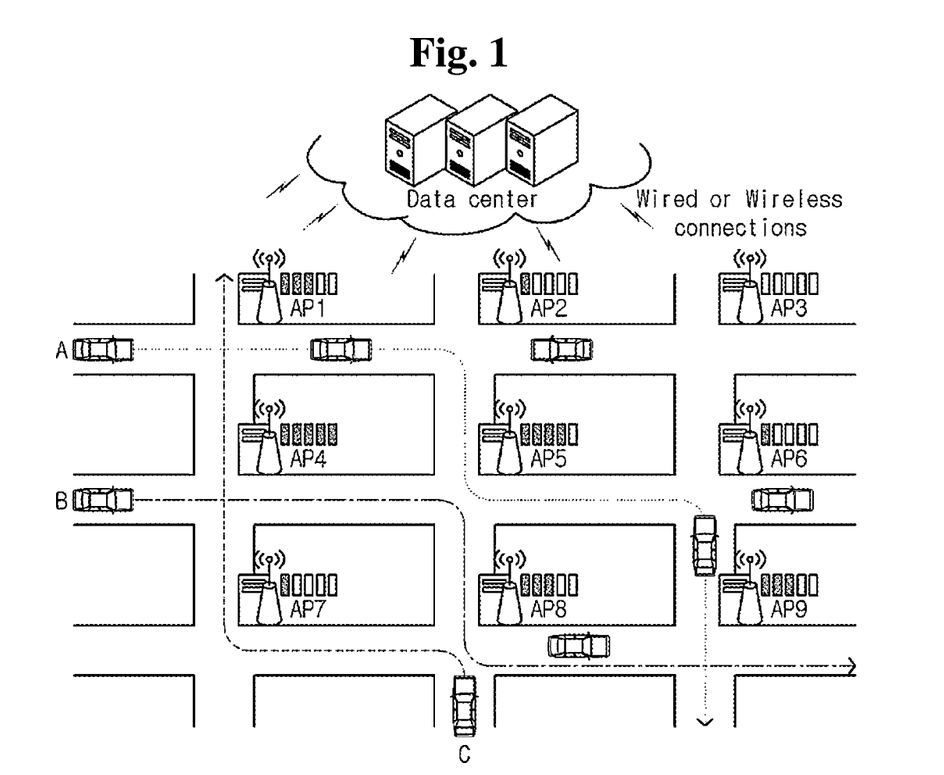
FIG. 1 is a diagram of an environment of a vehicle cloud.
Figure 2:
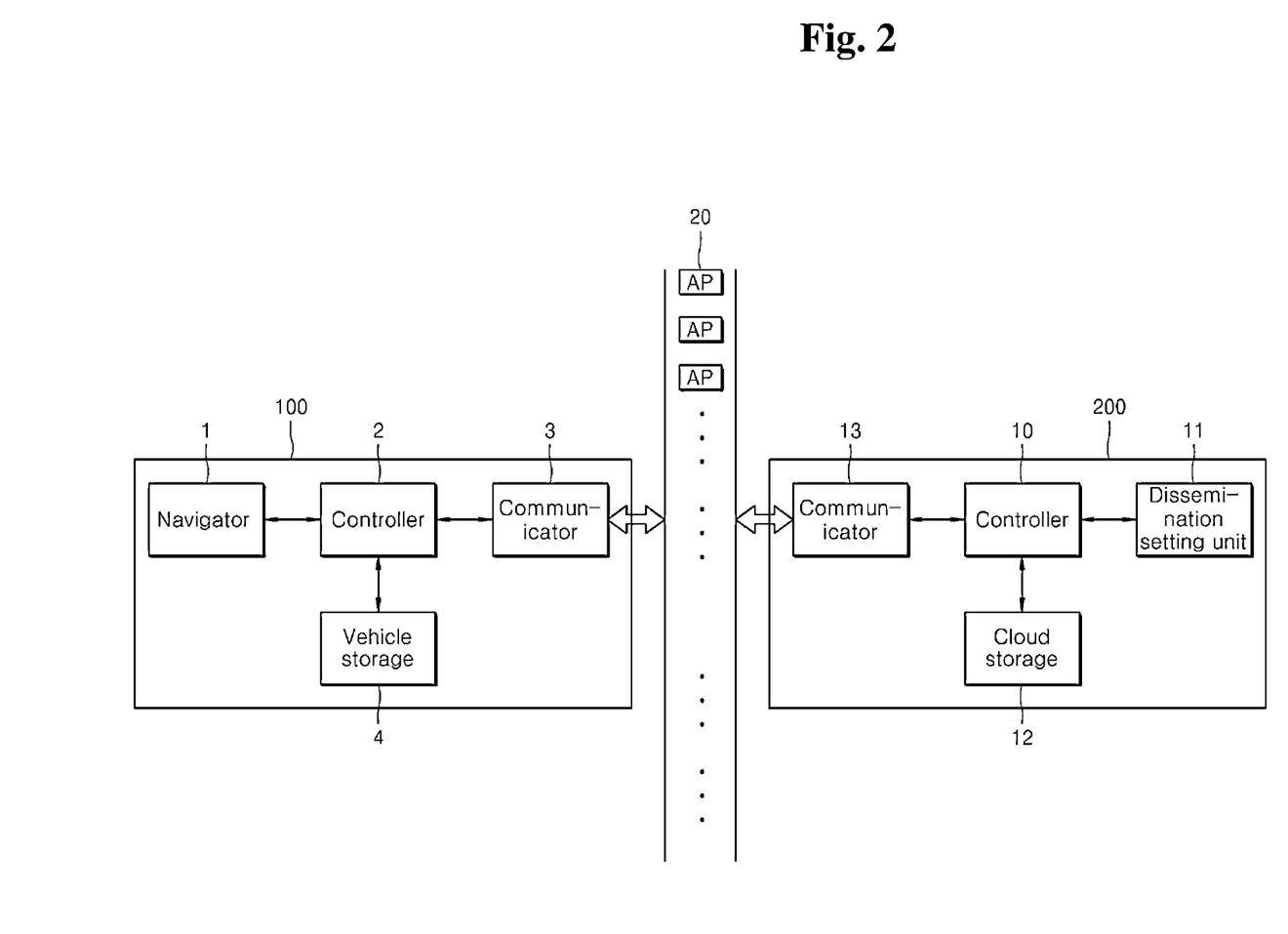
FIG. 2 is a diagram of a data dissemination system for vehicles.

FIG. 1 is a diagram of an environment of a vehicle cloud and FIG. 2 is a diagram of a data dissemination system for vehicles.

Referring to FIG. 1, a vehicle cloud system illustrated as a data center is connected to a plurality of access points (AP), which are stationary on a road where vehicles travel, by wire or wirelessly. The vehicles on the road are respectively indicated by A, B and C, and their traveling routes are illustrated by various dotted lines. The vehicles may access corresponding access points and receive data from the corresponding access points if the vehicles are adjacent to the access points. Each of the access points may be placed at a crossroad so as to communicate with a plurality of vehicles.

The vehicle cloud has a restricted environment as follows. First, the vehicles and the access points are intermittently connected and thus a plurality of access points is needed to disseminate data since the access points are stationary while the vehicles continue to move. Second, it is impossible to store all data since the access points have limited storage capacities.

Under the environment of the vehicle cloud, data dissemination may be schematically performed by the following method. First, each vehicle may transfer its own location and vehicle route information and information about request data to the vehicle cloud system. In the vehicle cloud system, the vehicle identifies desired data, and disseminates data to the corresponding access point placed on the route of the vehicle. At this time, the vehicle cloud system does not provide data requested by the vehicle to access points placed on a route where the vehicle does not travel. Thus, it is possible to prevent resources of the access points from being wasted, and to reduce useless network traffic.

FIG. 2 is a detailed block diagram of a data dissemination system for vehicles.

Referring to FIG. 2, the data dissemination system includes a traveling vehicle 100, a vehicle cloud system 200, and a plurality of access points 20 connecting the vehicle 100 and the vehicle cloud system 200 to each other. The vehicle 100 may transfer its location information and vehicle route information and information about request data to the vehicle cloud system 200. In the vehicle cloud system 200, data requested by the vehicle is identified and then disseminated to the access points 20 placed on the route of the vehicle. Then, the access points 20 disseminate the data to the vehicle 100.

Specifically, the vehicle 100 includes a navigator 1 providing information about a location and a vehicle route through which a driver reaches a destination, a communicator 3 communicating with the access point 20, a vehicle storage 4 storing data, and a controller 2 controlling these elements.

In more detail, the navigator 1 is an on-board navigation device of the vehicle, which receives an input of a destination of a user and provides the vehicle route information based on location information from a global positioning system (GPS). Alternatively, the navigator 1 may be a separate navigation device installed separately and connected to the vehicle. Alternatively, the navigator 1 may be a navigation device, which is a wireless terminal electronically connected through a separate communication network to receive navigation information through the separate communication network. It will be appreciated that various navigation devices may be used as the navigation 1 so long as they provide the location information and the vehicle route information to the controller 2. The communicator 3 transfers the vehicle route information from the navigator 1 to the vehicle cloud system 200 through the access points 20, and downloads information stored in the access points 20 through the vehicle cloud system 200. The vehicle storage 4 may store information provided from the vehicle cloud system 200 and temporarily store the vehicle route information. The navigator 1, the controller 2, the communicator 3, and the vehicle storage 4 may share resources needed when other functions of the vehicle are performed besides the data dissemination function according to embodiments, and may be provided as separate devices provided for the purpose of data dissemination.

Specifically, the vehicle cloud system 200 may include a dissemination setting unit 11 determining which data to disseminate to which access point, based on the location information, the vehicle route information and the information about request data from a plurality of vehicles, a communicator 13 communicating with the access point 20, a cloud storage 12 storing data, and a controller 10 controlling these components. The cloud storage 12 may include information stored in another vehicle.

The dissemination setting unit 11 operates as follows.

The dissemination setting unit 11 may include information about access points (for example, at least one of location information and arrangement information). Under conditions that the vehicle information (for example, the location information and the vehicle route information) and the data information (for example, chunk information) are known, information to be disseminated to the plurality of access points will be determined. In this case, if a plurality of vehicles request dissemination of various data, a process of solving this request will be involved. If the plurality of vehicles simultaneously request for the same data, a process of solving this request will be also involved.

Factors determining information to be disseminated to the access points are as follows. $\omega$ is the number of access points. v is the number of vehicles within a region of interest. u is the number of data chunks. The data chunk is a unit of each of elements that constitute data, which will be either called a chunk or a data chunk. The data chunk is a unit for dividing a large amount of data in practice and the number of data generally indicates the data chunk. However, for a small amount of data, the number of data may be named the data chunk. R is a chunk request matrix, $R=(r_{i,j})_{v \times u}$, where $r_{i,j}$ is 1 when the $i^{th}$ vehicle makes a request for the $j^{th}$ chunk but otherwise 0. S is a vehicle route matrix, $S=(s_{i,j})_{v \times \omega}$, where $s_{i,j}$ is 1 when the $i^{th}$ vehicle passes through the $j^{th}$ access point but otherwise 0. t is a communication probability vector, $t=(t_i)_{\omega \times 1}$, where $t_i$ is probability that the $i^{th}$ access point successfully connects with a certain vehicle within its own communication region. X is a binary determination matrix, $X=(x_{i,j})_{\omega \times u}$, where $x_{i,j}$ is 1 when the $j^{th}$ chunk is previously stored in the $i^{th}$ access point but otherwise 0. P is a dissemination failure probability matrix, $P=(p_{i,j})_{v \times u}$, where $p_{i,j}$ is probability that the $i^{th}$ vehicle fails to download the $j^{th}$ chunk.

With the foregoing factors, a probability that a certain vehicle fails to receive data is represented by Expression 1:

$$p_{i,j} = \prod_{k=1}^{w} (1 - s_{i,k} \cdot t_k \cdot x_{k,j}).$$

The inventor proposes the following methods as ways for achieving efficient data storage while satisfying the restriction that the vehicle and the access point are intermittently connected to each other and thus a plurality of access points is needed to disseminate data, and the restriction that the access points cannot store all data requested by all of the vehicles since the access points have limited storage capacities.

In a first method, minimum data is previously disseminated to all of the access points, if a minimum probability that each of the vehicles fails to receive data while traveling based on the vehicle route information is given. In a second method, a probability that each of the access points fails to disseminate data to the vehicle is minimized, when the access points have limited storage capacities. With these methods, it was confirmed that an optimal solution could be obtained through a greedy algorithm.

Next, the first method will be described in more detail.

If the minimum probability that each of the vehicles fails to receive data while traveling based on the vehicle route information is given, the method of previously disseminating the minimum data to all of the access points can be represented by Expression 2:

$$\text{minimize } 1_w^T x_j$$

$$\text{subject to } \|r_j \odot p_j\|_{max} \leq \epsilon$$

$$x_j \in \{0,1\}^{w \times 1},$$

where $1_1 \in R^1$ indicates a vector having all elements of 1, $\epsilon$ indicates a minimum probability of failing to receive request data, and $\odot$ indicates a Hadamard operator.

The process of obtaining the solution of Expression 2 is performed by the greedy algorithm as described above. A detailed operation of the greedy algorithm will be described hereinafter. A dissemination failure probability P varies depending upon a row vector of a binary determination matrix X. If all elements are 0 in one row vector of the matrix X, a corresponding matrix P has a maximum element of 1, and the maximum element of the matrix P becomes smaller as one element in the row vector of the matrix X is changed from 0 to 1. Therefore, the greedy algorithm according to this embodiment may stop the operation of changing 0 to 1 if the maximum element is smaller than $\epsilon$ for the first time. Thus, it is possible to satisfy the restricted conditions of Expression 2. Since the algorithm of Expression 2 serves to minimize the number of total elements of 1 in the vector $X_j$, it can also be achieved when the maximum element of the matrix P becomes smaller by the least times of changing the elements in the row vector of the matrix X from 0 to 1. Eventually, it is possible to most rapidly make the maximum element become smaller if the vector elements of 0 are selected and changed into 1 such that the maximum element in the matrix P can have a minimum value at each iteration. This may be called greedy selection.

Expression 3 shows pseudo code for obtaining the solution of the first method through the greedy algorithm.

[Expression 3]
Algorithm 1 Proposed greedy algorithm for minimizing data transfer

```
Require: ω, v, μ, ε, S, p, t, r, x
    1:   // Index set A_xj:A_xj = {i:x_ij = 1, x_ij ∈ x_j, ∀i}
    2:   // Initialization
    3:   A_xj = ∅ // the corresponding vector x_j = 0
    4:   // Main loop
    5:   for j = 1 to u do
    6:       while A_xj ≠ A_x_ω×i do
    7:
             Find the index i* = arg min_{i*∈A_x_ω×i \ A_xj} ‖ r_j ⊙ p_j(A_xj ∪ {i*}) ‖_max
    8:           if ‖r_j ⊙ p_j(A_xj ∪ {i*})‖max ≤ ε then
    9:               Stop the algorithm
   10:           end if
   11:           A_xj ← A_xj ∪ {i*}
   12:           x_j[i*] ← 1
   13:       end while
   14:   end for
```

In accordance with the determination based on the first method, a chunk of data is disseminated to the access points, and the data chunk disseminated to the access points is transferred to the vehicle. Thus, it is possible to minimize the probability that the vehicle fails to receive data while disseminating the minimum data to the access points.

Next, the second method will be described in more detail. When the access points have limited storage capacities, the method of minimizing the probability that each access point fails to disseminate data to the vehicle can be represented by Expression 4:

$$g(X) = \sum_{i=1}^{v} \sum_{j=1}^{u} r_{i,j} \cdot p_{i,j}$$

minimize $g(X)$ subject to $\|X \cdot 1_i\|_{max} \leq b$ $X \in \{0, 1\}^{w \times u}$, where g(X) indicates a function showing a total sum of data dissemination failure probability and b indicates a maximum storage capacity of the access point. A process of obtaining the solution of Expression 4 is performed by greedy algorithm as described above.

A detailed operation of the greedy algorithm will be described hereinafter. A minimum value of g(X) is iteratively searched while changing one element of the matrix X from 0 to 1. It is possible to find the minimum value of g(X) from the limited storage capacity b, based on the characteristics of p in the first method, that is, the characteristics that the value becomes smaller as one element of the matrix X is changed from 0 to 1. In other words, it is possible to make g(X) approximate the optimal solution if one element of the matrix X is changed from 0 to 1 such that g(X) can have a minimum value at each iteration. This may be called greedy selection.

Since the second method can make g(X) smaller as more elements of the matrix X are changed from 0 to 1, the second method can be terminated by operation of changing the elements in the matrix X from 0 into 1 up to the limit b. However, if the limited capacity is sufficiently larger than the request data, g(X) is not decreased any more at a certain value even though the elements of the matrix X are not changed from 0 into 1 up to the limit b, and iteration can be terminated.

Expression 5 shows pseudo code for obtaining the solution of the second method through the greedy algorithm.

[Expression 5]
Algorithm 2 Proposed greedy algorithm for minimizing the data dissemination failure probability 1: //Index set:$B_X = \arg\min_{B_X \subseteq B_x} G(B_X)$
2: // Initialization
3: $B_X = \emptyset$
4: $B_X c = \emptyset$
5: // Main loop
6: for l = 1 to w × b do
7: $\{(m, n)\} = \arg\min_{(i,j) \in B_{x_{\omega} \times i} \setminus (B_X \cup B_X a)} G(B_X \cup B_{x_{i,j}})$
8:   if $(X \cdot I_x)_m \geq$ b then
9:     $B_X c = B_X c \cup B_{x_{m,n}}$
10:    Go back to line 7.
11:  end if
12:  $B_X = B_X \cup B_{x_{m,n}}$
13:  X(m, n) = 1
14: end for In accordance with the determination based on the second method, a chunk of data is disseminated to the access points, and the data chunk disseminated to the access points is transferred to the vehicle. Thus, it is possible to minimize the probability that each access point fails to disseminate data to the vehicle within the limited storage capacities of the access points.

Through the foregoing methods, the dissemination setting unit 11 can determine whether to disseminate the data chunk to the respective access points. By the dissemination methods, information stored in the cloud storage 12 can be disseminated to the access points 20 through the communicator 13 under control of the controller 10. Then, when a vehicle approaches a certain access point 20, the vehicle can receive data from the corresponding access point 20.

Next, a data dissemination method for vehicles according to one embodiment will be described. The dissemination method according to this embodiment is based on the description of the dissemination system and will be referred to the description of the dissemination system. Thus, repeated descriptions thereof will be omitted.

Figure 3:
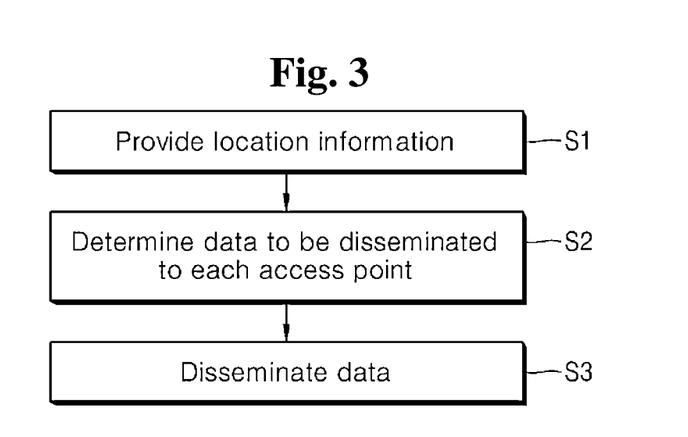
FIG. 3 is a flowchart illustrating a data dissemination method for vehicles.

FIG. 3 is a flowchart illustrating a data dissemination method for vehicles.

Referring to FIG. 3, a vehicle may provide location information to a vehicle cloud system (S1). Here, destination information may be provided together with location information on a map where the vehicle is located, or the location information and the destination information may be provided together with vehicle route information through which the vehicle reaches a destination. When the vehicle transfers the location information to the vehicle cloud system, an access point on a road or a separate wireless network may be used. The vehicle may transfer information about desired data together with the location information. Here, at least two vehicles may be provided.

The vehicle cloud system receiving various pieces of information from the vehicles may determine a method of disseminating data to at least two access points scattered on the road (S2). At this time, the data dissemination method is determined by greedy algorithm with reference to vehicle information, access point information and information about data. The greedy algorithm may be performed by the first optimization method of previously disseminating minimum data to all of access points, if a minimum probability that each vehicle fails to receive data while traveling based on the vehicle route information is given. The greedy algorithm may also be performed by the second optimization method of minimizing the probability that each access point fails to disseminate data to the vehicles, when the access points have limited storage capacities.

If the method of disseminating data to at least two access points is determined, data is disseminated to each of the access points in chunks (S3). The disseminated data may be transferred to a vehicle when the vehicle approaches a certain access point.

As described above, the vehicle, the vehicle cloud system, and the data dissemination system and method for vehicles have advantageous effects as follows.

Figure 4:
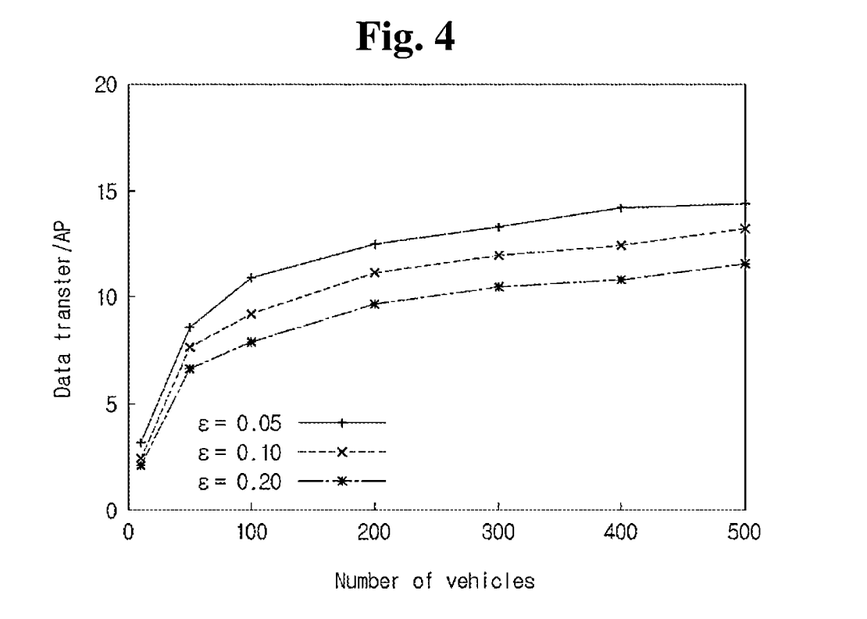
FIGS. 4, 5 and 6 are graphs showing simulation results of a method of disseminating minimum data to an access point under a minimum dissemination-failure probability.
Figure 5:
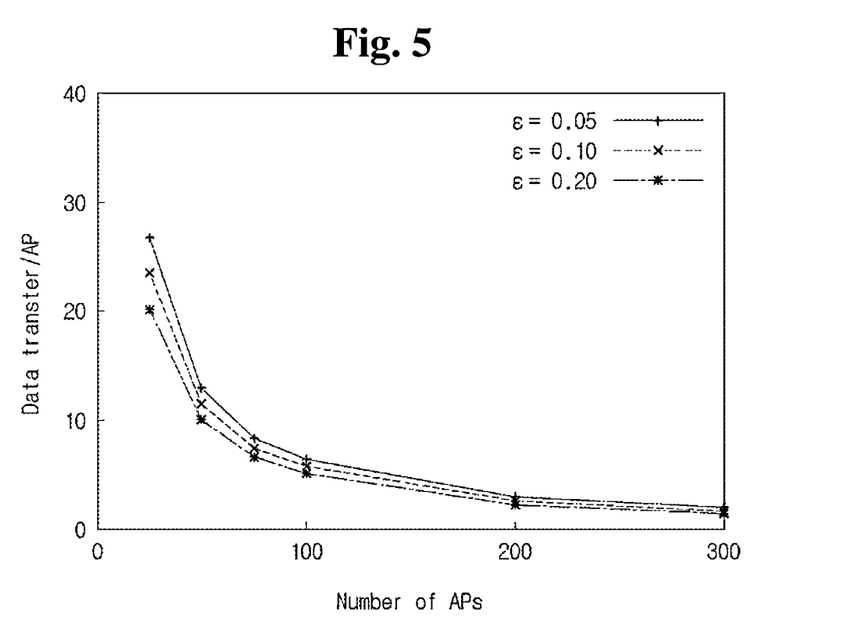
Figure 6:
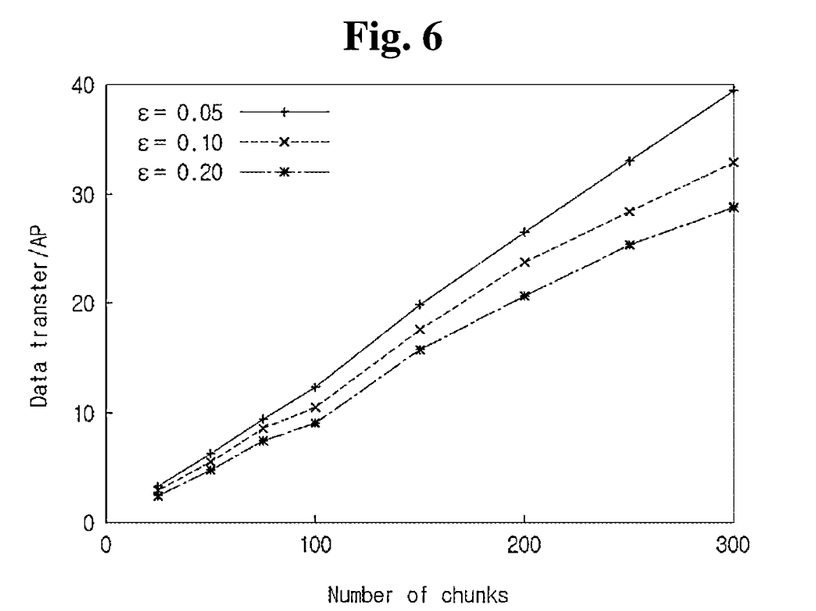

FIGS. 4, 5 and 6 show simulation results based on the first method of disseminating minimum data to access points at a minimum dissemination failure probability. FIG. 4 shows experimental results obtained while changing the number of vehicles under conditions that the number of access points is 50, the number of chunks is 100, and the minimum dissemination failure probabilities are 5%, 10% and 20%. FIG. 5 shows experimental results obtained while changing the number of access points under conditions that the number of chunks is 100, the number of vehicles is 250, and the minimum dissemination failure probabilities are 5%, 10%, and 20%. FIG. 6 shows experimental results obtained while changing the number of data chunks under conditions that the number of vehicles is 250, the number of access pints is 50, and the minimum dissemination failure probabilities are 5%, 10%, and 20%.

Referring to FIGS. 4 to 6, the ordinate indicates an average amount of data disseminated to each of the access points. In any cases, the amount of disseminated data is significantly reduced. In particular, referring to FIG. 4, although the average amount of disseminated data increases as the number of vehicles increases, an increasing ratio decreases and thus converges on a certain value. Referring to FIG. 5, the amount of disseminated data decreases since the storage capacity increases more than the amount of request data as the number of access points increases. Referring to FIG. 6, the average amount of disseminated data increases as the amount of request data increases.

Figure 7:
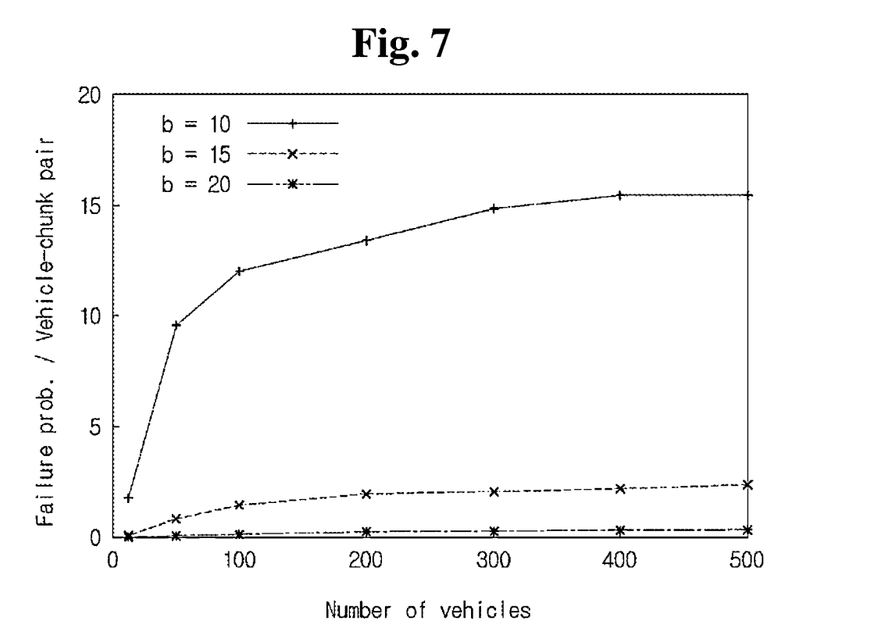
FIGS. 7, 8 and 9 are graphs showing simulation results of a method of minimizing a probability that each access point fails to disseminate data to a vehicle under a minimum access-point storage capacity.
Figure 8:
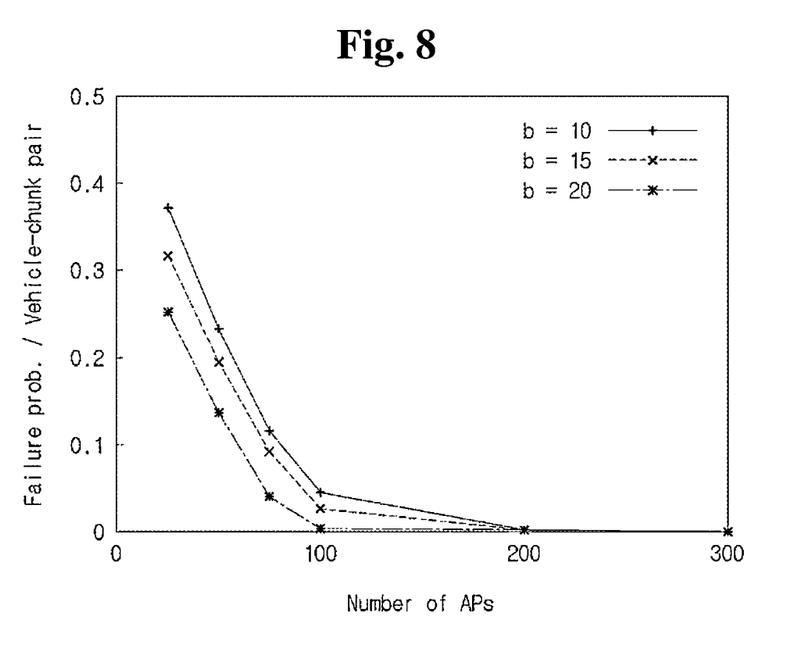
Figure 9:
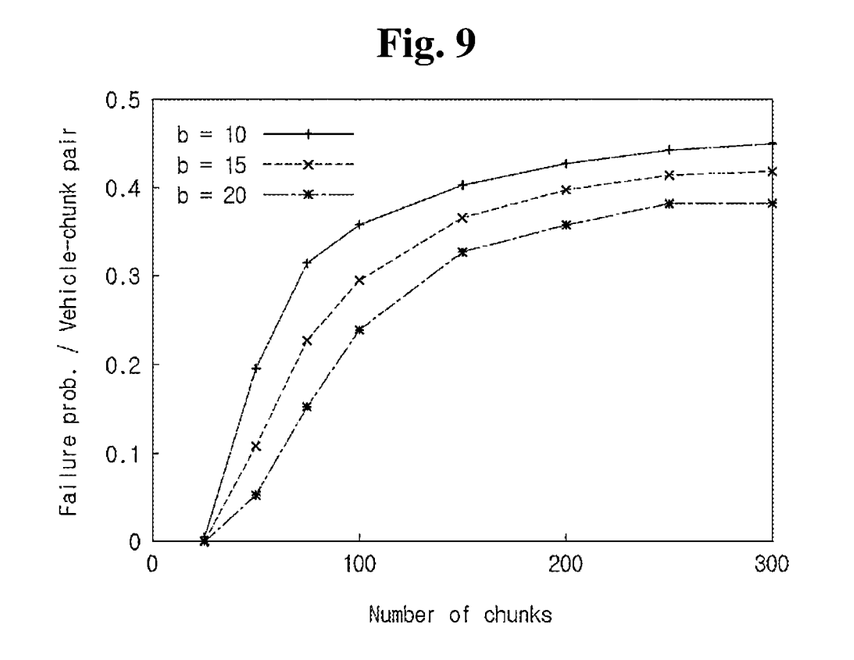

FIGS. 7, 8 and 9 are graphs showing simulation results based on the second method of minimizing a probability that each access point fails to disseminate data to a vehicle, under the minimum access-point storage capacity. FIG. 7 shows experimental results obtained while changing the number of vehicles under conditions that the number of access points is 50, the number of chunks is 100, and the storage capacities of the access points are 10, 15 and 20. FIG. 8 shows experimental results obtained while changing the number of access points under conditions that the number of chunks is 100, the number of vehicles is 250, and the storage capacities of the access points are 10, 15 and 20. FIG. 9 shows experimental results obtained while changing the number of data chunks under conditions that the number of vehicles is 250, the number of access pints is 50 and the storage capacities of the access points are 10, 15 and 20.

Referring to FIGS. 7 to 9, the ordinate indicates an average data dissemination failure probability with respect to the vehicles and the data chunks. Referring to FIG. 7, although the average data dissemination failure probability increases as the number of vehicles increases, an increasing ratio gradually decreases and thus converges on a certain value. Referring to FIG. 8, the average data dissemination failure probability decreases since the storage capacity increases more than the amount of request data as the number of access points increases. Referring to FIG. 9, the average amount of disseminated data increases but converges on a certain value since the amount of request data increases as the number of data increases.

As shown in the accompanying graphs, it is possible to minimize the amount of disseminated data and minimize the dissemination failure probability by referring to the route of the vehicle and optimizing data dissemination through the greedy algorithm.

In addition to the foregoing embodiments, the present invention may further include other embodiments. For example, when a vehicle is provided with a global positioning system (GPS) and has no separate module for providing vehicle route information, the dissemination setting unit may set the vehicle route information by searching a map based on location information received from the GPS of the vehicle and destination information received from the exterior, and may transfer the vehicle route information to the vehicle or disseminate data, even though a separate module is provided. In this case, the dissemination setting unit can set dissemination of data. Alternatively, the destination information may be registered in the vehicle cloud system through previous registration and the like. In this case, only the location information about the vehicle is transferred from the vehicle.

Although this embodiment is illustrated as being applied only when data is transferred from the vehicle cloud system to the vehicle, it should be understood that the present invention is not limited thereto. Alternatively, this embodiment may be applied even when data is transferred from the vehicle to the vehicle cloud system.

INDUSTRIAL APPLICABILITY

According to the present invention, data transfer between vehicles and an infrastructure can be easily achieved such that a large amount of data can be exchanged therebetween, data transfer efficiency can be enhanced, and network resources can be fully utilized. Accordingly, the present invention has advantages of contributing to dissemination and utilization of the vehicle cloud system.

What is claimed is:

1. A data dissemination system for vehicles, comprising:
   a vehicle;
   a vehicle cloud system; and
   access points connected with and configured to transfer data to the vehicle and the vehicle cloud system, the access points being stationary along a road, wherein
   the vehicle comprises:
      a navigator configured to determine location information; and
      a communicator communicating with the access points,
   the vehicle cloud system comprises a dissemination setting unit configured to determine which data to disseminate to which access point based on the location information and vehicle route information so that the data disseminated to the access point is further disseminated to the vehicle; and
   the communicator is configured to transfer the location information from the navigator to the vehicle cloud system through the access points, and download information stored in the access points through the vehicle cloud system.

2. The data dissemination system according to claim 1, wherein the vehicle route information is generated in the navigator and transferred to the vehicle cloud system.

3. The data dissemination system according to claim 1, wherein the dissemination setting unit is configured to disseminate minimum data to the access points, in case a minimum probability that the vehicle fails to receive the data while traveling based on the vehicle route information is given.

4. The data dissemination system according to claim 3, wherein the dissemination of the minimum data is performed by a greedy algorithm.

5. The data dissemination system according to claim 1, wherein the dissemination setting unit is configured to minimize a probability that the access point fails to disseminate the data to the vehicle, so that the data is disseminated to the access point, when the access points have limited storage capacities.

6. The data dissemination system according to claim 1, wherein each of the access points is placed at a crossroad.

7. The data dissemination system according to claim 1, wherein the vehicle route information is generated in the vehicle cloud system as the vehicle transfers destination information together with the location information to the vehicle cloud system.

8. The data dissemination system according to claim 1, wherein the vehicle route information is generated in the vehicle cloud system based on destination information registered to the vehicle cloud system and the location information.

* * * * *